July 22, 1969  W. S. EHRENZELLER ET AL  3,456,604
INCINERATOR
Filed March 11, 1966  3 Sheets-Sheet 1
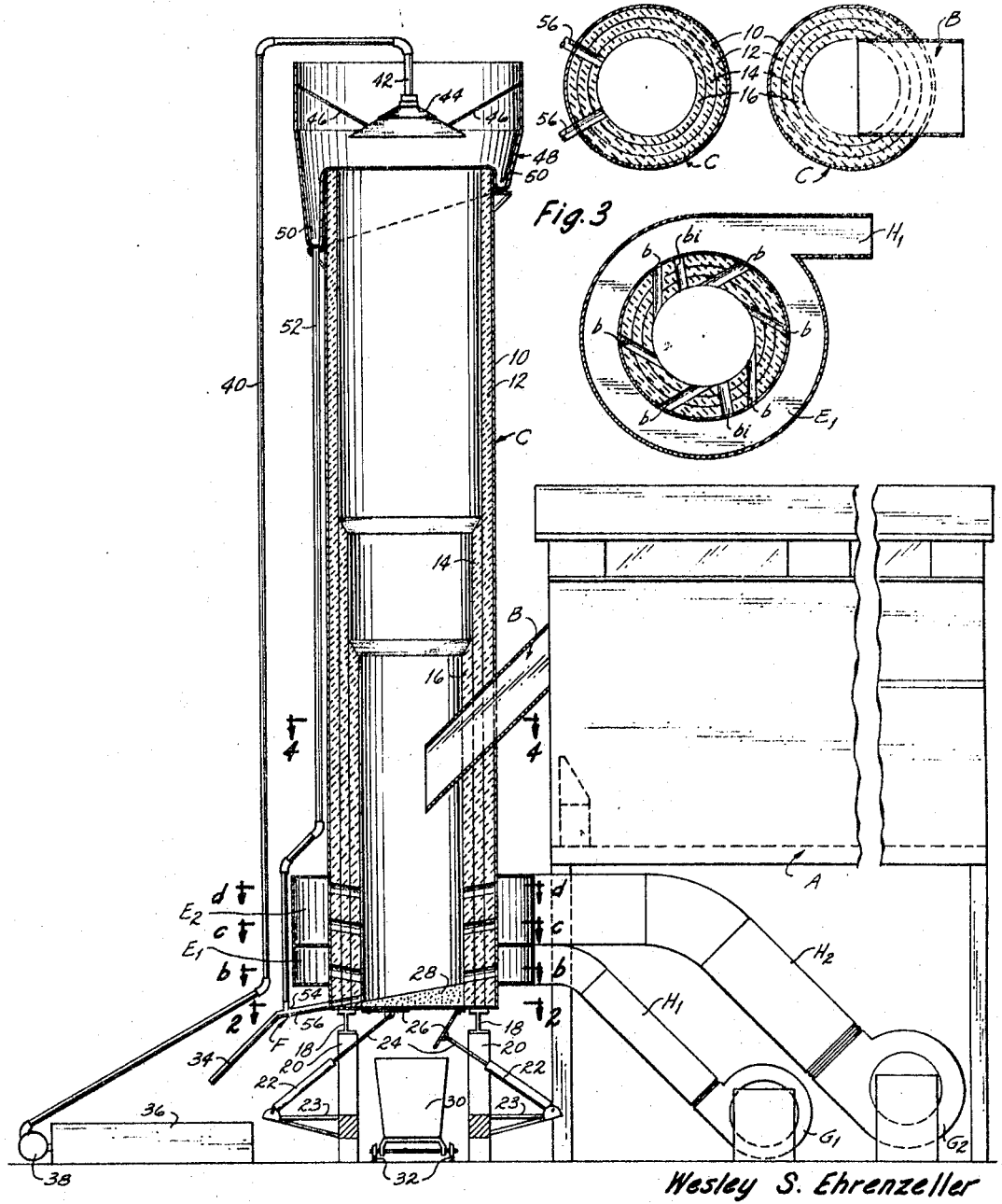
Wesley S. Ehrenzeller
Donald H. Coll
INVENTORS
BY *Aaron Tushin*
ATTORNEY July 22, 1969　　W. S. EHRENZELLER ET AL　　3,456,604
INCINERATOR Filed March 11, 1966　　3 Sheets-Sheet 2

Wesley S. Ehrenzeller
Donald H. Call
　　INVENTORS

BY　*Aaron Tushin*
　　ATTORNEY

July 22, 1969   W. S. EHRENZELLER ET AL   3,456,604
INCINERATOR
Filed March 11, 1966   3 Sheets-Sheet 3

Wesley S. Ehrenzeller
Donald H. Call
INVENTORS

BY
ATTORNEY

United States Patent Office 3,456,604
Patented July 22, 1969

3,456,604
INCINERATOR
Wesley S. Ehrenzeller, Hanover, and Donald H. Call, West Roxbury, Mass., assignors to American Design and Development Corporation, North Abington, Mass., a corporation of Massachusetts
Continuation-in-part of application Ser. No. 447,593, Mar. 25, 1965. This application Mar. 11, 1966, Ser. No. 533,478
Int. Cl. F23g 3/06
U.S. Cl. 110—8                                    5 Claims

ABSTRACT OF THE DISCLOSURE

A cylindrical incinerator having two wind boxes outside and near the bottom of the incinerator, each wind box supplied by separate tangential ducts and supplying separately controlled volumes of air to different levels in the incinerator.

---

This application is a continuation-in-part of applicants' copending application Ser. No. 447,593 filed Mar. 25, 1965, entitled, Incinerator, now Patent No. 3,412,696.

This invention relates to a method and apparatus for disposing municipal wastes such as combustible refuse, trash, including paper products, garbage, semi-solid sanitary sludge such as produced from municipal sewerage treatment plants to cause complete destruction thereof, and all other organic materials as well as inorganic materials such as glass, tin cans, etc. More specifically the present invention relates to novel type tuyere systems in combination with other novel features for extremely efficient and uniform combustion and reduction of all organic and inorganic matter presented for disposal in municipal incinerators wherein a novel method and device is provided for introducing air at two or more levels and having at least two separate wind-boxes surrounding the outside of said stack near the bottom thereof for supplying separately controlled combustion-supporting gases under superatmospheric pressures through separate tuyere systems from separate superatmospheric gas sources into the combustion areas of said stack, in the combustion area of an incinerator in combination with other novel features of said device.

The present invention relates to other combinations of novel method and means for a most efficient, economical means for disposing all municipal refuse, whether combustible or not, and thus eliminating objectionable dumps which heretofore have been necessary adjacent to all municipalities, cities and towns of the country. In addition the present invention includes novel means for control of polution whether in the ambient atmosphere or in the ground.

While it is true that the incinerator art is an old one and in limited present-day operation throughout the country, it has nevertheless proven prohibitively expensive to build and operate, very inefficient in that complete combustion is not often attained, constant shutdowns for cleaning and repairs are necessary, and usually only partially useful for the disposal of all refuse such as newspapers, wooden boxes, garbage, and other sundry articles of organic material in combination with much inorganic material which is not heat volatile, but rather meltable or fusible at high temperatures. In addition, such common incinerators are notorious eyesores to the surrounding communities, creating escaping offensive odors, smoke and gaseous products of combustion, thus causing the pollution of the ambient atmosphere. All these objectionable and undesirable effects tend to depreciate land values in the adjacent areas.

Accordingly, one object of this invention is to provide an incinerator assembly with a novel wind-box with tuyeres therein which cause complete and uniform combustion of all dry or wet organic matter at very high controlled temperatures.

A further object of this invention is to provide such tuyeres in two or more levels in the combustion chamber which effect complete and efficient combustion at such high temperatures as to melt all noncombustible material for removal from the incinerator bed without necessarily removing all the bed contents for continuous useful combustion in the incinerator.

Another object of this invention is to provide a double tuyere system wherein separate controls are involved for introducing air or optionally a mixture of air and additional oxygen to the combustion area under separate superatmospheric pressures and volumes.

Another object of this invention is to provide a novel combination of a wet-cap recirculating system at the top exhaust section of the incinerator for control of air pollution in the ambient atmosphere and reduction of the final residue to an inert, inorganic residue of small particle sizes having many commercial uses.

Another object of this invention is to provide improved circulation and maximum contact of the air, and/or oxygen if found necessary, for the very high temperature complete combustion of the refuse matter in the incinerator.

Another object of this invention is to employ at least part of the bed refuse contents to contribute its values of heat of combustion thereby minimizing the cost of fuel which would otherwise be necessary to effect complete combustion of the entire bed refuse contents.

Still another object of this invention is to provide a method and device which will reduce by high temperature combustion all types of municipal refuse, both organic and inorganic, to its maximum destruction whereby the quality and quantity of the residue is an inert, inorganic material which when deposited on the surface of the surrounding area will not pollute any present watershed area.

Another object is to effect the consummation of rather large quantities of wet materials, such as garbage; reduce metal and glass articles such as tin cans, bicycles, bottles, etc., to their lowest common denominator in a fused state, thus avoiding selective feeding or mechanical separation without or within the combustion chamber.

To effect these objects and such other objects as may appear hereinafter, reference is made to the accompanying drawings, forming a part hereof, in which:

FIG. 1 is a sectional elevation view of a complete incinerator assembly showing diagrammatically the various components of the incinerator;

FIG. 2 is a cross-section view at the base of the incinerator through the residue spout along line 2—2 of FIG. 1;

FIG. 3 is a cross-sectional view essentially along line b—b of FIG. 1 showing the alignment of tuyere ports and inspection ports. Also FIG. 3 is a cross-sectional view along lines c—c and d—d except that the alignment of tuyere ports in the stack itself would be rotated approximately 60° for each succeeding layer of tuyere ports;

FIG. 4 is a cross-sectional view of the charging chute along line 4—4 of FIG. 1;

Referring now to FIG. 1, the overall device comprises a raised refuse receiving building generally indicated as at A which is of any suitable construction such as metal or masonry with preferably a concrete floor, ventilation means, windows, etc. It is contemplated that this building would contain an office area with an indicating and control panel considered necessary to the safe overall operation and supervision of the incinerator complex. Receiving doors (not shown) might be located on either or both sides of the building as may be convenient to the operation of the incinerator.

Figure 5:
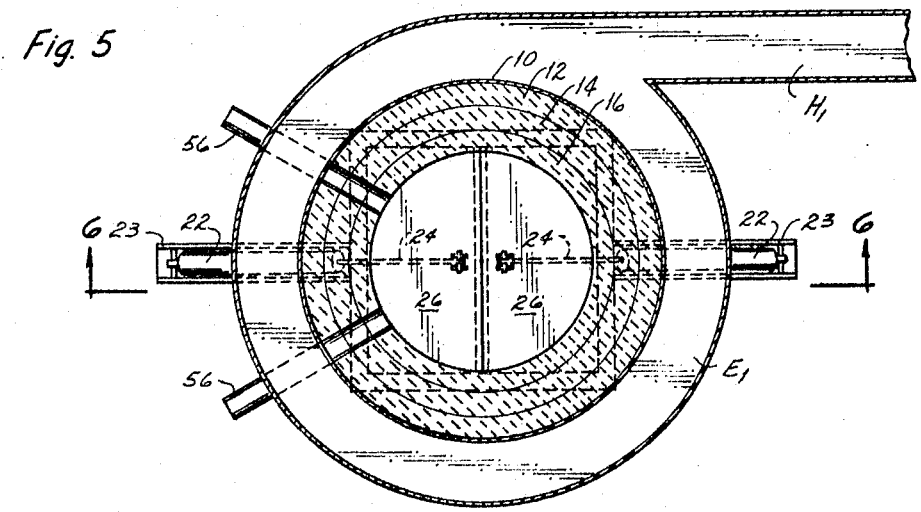
FIG. 5 is a cross-sectional plan view of the clean-out doors at the base of the furnace along lines 5—5 of FIG. 6 showing two residue spouts, clean-out doors, and door-jacks.
Figure 6:
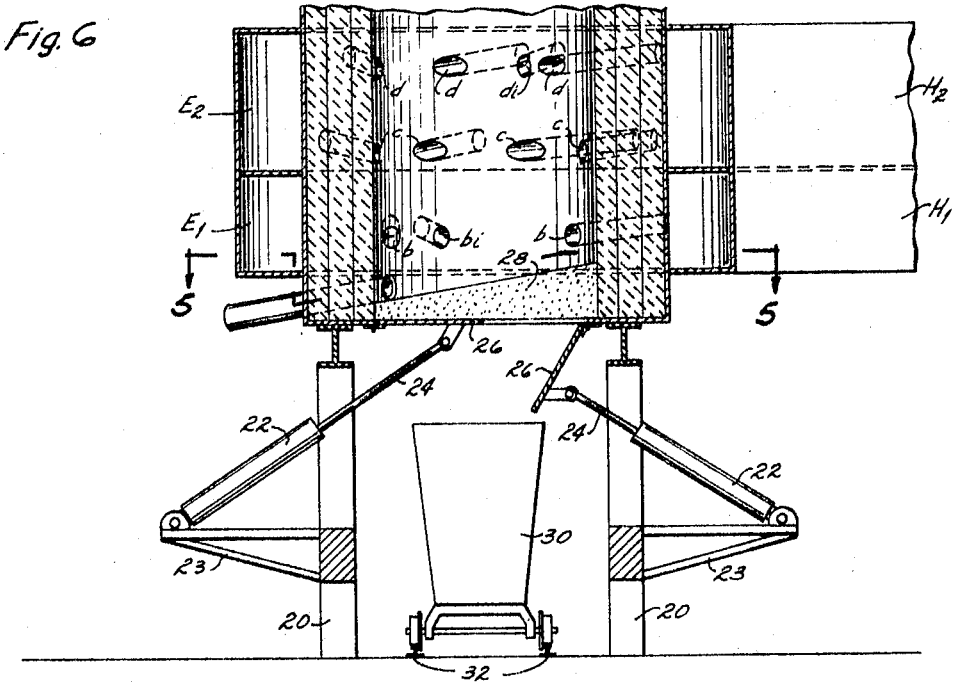
FIG. 6 is a cross-sectional elevation view along lines 6—6 of FIG. 5 of the lower portion of the incinerator of FIG. 1.

At the end of the receiving building A nearest the incinerator is located the charging chute B of the type shown in our parent application referred to above. The charging chute B is directly connected to the incinerator stack C from building A, said incinerator stack C being more fully described in detail hereinafter. In the partial section of the stack C of the incinerator below the charging chute B can be seen the wind-boxes E1 and E2 with several levels of tuyeres $b$—$b$, $c$—$c$, $d$—$d$, which are preferably staggered as are shown in FIGS. 6 and 8 to be described in more detail hereinafter. Below receiving building A can be seen two forced draft fans G1 and G2 operable at independent controlled speeds, with connecting ducts H1 and H2 from said fans to wind-boxes E1 and E2 respectively circumferentially to said stack. As clearly depicted in FIGURES 5 and 7, ducts $H_1$ and $H_2$ are shown to direct the forced combustion-supporting gases from the fans into wind-boxes $E_1$ and $E_2$, respectively, tangential to the inner and outer walls of the same causing uniform distribution of said gases around the entire circumferential area of the wind-box. This results in more uniform, in contra-distinction from "spotty," burning of the refuse inside the stack combustion area. It will thus be apparent that the introduction of air to the combustion area of the stack is controlled independently at two or more levels (E1 and E2). The lowest level of air introduction may include one or more rows of tuyere ports $b$ and is for the purpose of providing combustion air to the fuel bed. The upper level of air introduction, which may also include one or more rows of tuyere ports, provides the combustion air for the destruction of such materials as rubbish, garbage, and/or semi-solid sanitary sludge fed to the furnace through chute B. The fuel for the bed could be any common type such as coke and coal, but other auxiliary fuels could include woods chips, gas, electricity, etc. While the chute B is used for the introduction of the fuel to the bed, in the case of supplementary fuel use of gas, electricity or oil, the use of the chute B for introducing the same to the bed would be unnecessary. It is accordingly clear as shown in FIGS. 1 and 6 of the drawings that air, air with added oxygen, the volumes thereof, and the pressures involved in the introduction of the same to the combustion areas of the stack can be varied with complete control to obtain the desired combustion and destruction of the municipal-type waste materials at predetermined high temperatures.

As shown in FIGS. 1 and 6, a hard packed layer of sand or other suitable infusible material 28 is slanted toward the residue trough generally designated as at F to which extention residue trough 34 is attached for guiding the outflowing residue to receiving or quenching pan 36.

The stack C of the furnace or incinerator interior is lined with three layers of high temperature refractory brick at the base tapering to one row 12 at the top of the stack having an outer covering of hard metal 10; the second or middle layer 14 tapering off a distance between the entrance of the refuse from chute B and the top of the stack, and the innermost or third layer 16 of refractory material tapering off below the middle layer and just above the entrance of the refuse chute B to the stack C. This arrangement of insulation is found effective since the temperatures within the stack of the incinerator are highest nearer the bottom where the fuel is burned and diminish on the way up the stack.

At the base of the furnace there is shown two beams 18 supported by columns 20 upon which the incinerator is supported a distance above the ground or floor, sufficient to allow a rolling hopper car 30 on rails 32 to be moved in and out of placement to remove the clean-out sand material 28 when necessary for cleaning and replacement. The clean-out doors 26 have hydraulic cylinders or jacks 22 with pistons 24 attached thereto for operation of clean-out doors 26. Support ledges or mounts 23 support the hydraulic cylinders upon columns 20 (see also FIG. 6).

The residue spout assembly F comprises at least one and preferably two separate troughs 56 (see FIGS. 2, 5, and 7), an extension 34 attached thereto for guidance of the residue to a quenching tank 36 to receive and reduce the molten residue. Make-up water is added to the quenching tank system from time to time (not shown) which is recirculated by means of pump 38 through pipe lines 40 and 42 to the wet cap assembly 48 at deflector 44 above the open top of stack C, thence into wet cap return trough 50, return pipe 52 and at 54 to the residue trough 36. The incinerator deflector cap 44 is bounded on the outside by a fly ash screen 46 which returns larger size particles back to the furnace for further reduction. This arrangement is shown as an optional means of controlling fly ash with an emission return duct as disclosed in applicants' parent case referred to hereinabove. The wet cap assembly provides a very simple, economical and important function for the prevention of air pollution in the ambient atmosphere. The quenching system also results in the molten residue taking a granular form, often less than ¼" in particle average diameter size. This allows for easier handling, storage and transportation.

Full size clean-out doors 26 and an additional residue spout 56 are provided for ease of operation in the event the temperature of the residue should for any reason cool off and allow the residue to harden in the operating spout and thus plug up. In this case the second spout may be opened when the proper temperatures have been reached again. The "frozen" spout may then be opened or "freed" without entailing the disadvantages of a shut-down. Full size base doors permit easier cleaning, when necessary, and thus reduce the amount of down-time required.

FIGS. 1, 3, 6, 7 and 8 show different views of a most important feature of the present invention which involves the use of more than one draft fan for introducing air, independently, at or more than one level of corresponding wind-boxes E1 and E2 in the incinerator. The lowest level E1 of air introduction includes one (or more if desired) rows of staggered tuyere ports $b$ for the purpose of providing combustion air to the fuel bed which is the start-up chamber of exogenous fuel. The upper level E2 of air introduction, which may also include one or more rows of tuyere ports $c$ and $d$, provide the combustion air for the description of materials such as rubbish, garbage, semi-solid sanitary sludge and/or other refuse, which are fed to the incinerator for disposal. This system is an advance in the art wherein the introduction of combustion air allows a far greater control over the combustion in the incinerator and results in a very economical operation due to an increased burning rate where and when desired and the use of the rubbish itself to contribute its own heat of combustion above the original layer of fuel bed heat contribution. As will be readily apparent that under the controlled combustion area of the present incinerator system the refuse of organic material fed to the stack from chute B would rest on the upper level of the combustion chamber and the controlled feeding of air, or oxygen preferably a combination of the same as hereinafter described, will cause the refuse itself to burn with increased available temperatures and total reduction of the same in the furnace. It will be apparent that the symbolic different sizes of fans $G_1$–$G_2$, ducts $H_1$–$H_2$, wind boxes $E_1$–$E_2$, and the different number of tuyeres $b$, and $c$–$d$ in wind-boxes $E_1$, $E_2$, shown in FIG. 1 indicate the controls providing variable pressures and volumes of combustion-supporting gases to the wind-boxes to be supplied to the different combustion areas at different levels of the incinerator stack thus resulting in maximum control of volumes of air, oxygen, pressures, and levels of combustion at all sections of the burning areas, which in turn also effects proper turbulence and prevents undesirable air channeling in the stack. It was found under these conditions that an improved fuel economy of 1:40 to 50 against 1:25 in the prior art designs were effected. In addition there was obtained an increased burning rate in excess of 21 tons per hour as compared to 5 tons per hour.

FIG. 1 also shows tuyere arrangement wherein the level of tuyeres are declined from the horizontal up to 10° and enter the stack C tangentially. This feature has the great advantage of entering the combustion area underneath the layers of fuel and refuse in the stack with a whirling and turbulence action, tortuous, and agitating force throughout the fuel and refuse mass in the stack. This promotes better combustion and creates a longer distance for the air to travel, and thus more combustion time.

Figure 7:
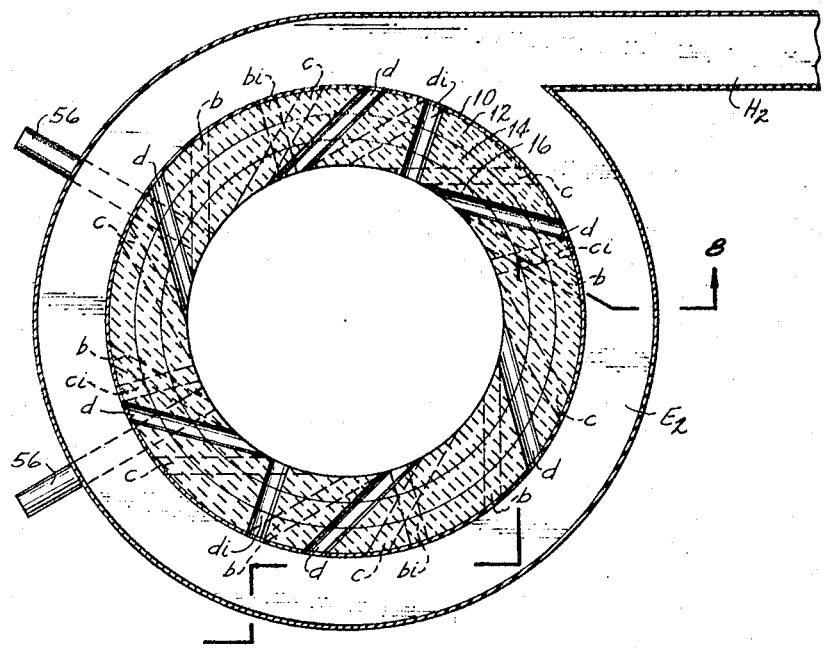
FIG. 7 is a cross-sectional plan view along lines 7—7 of FIG. 8 showing the staggered alignment of the multiple layers of tuyere ports.
Figure 8:
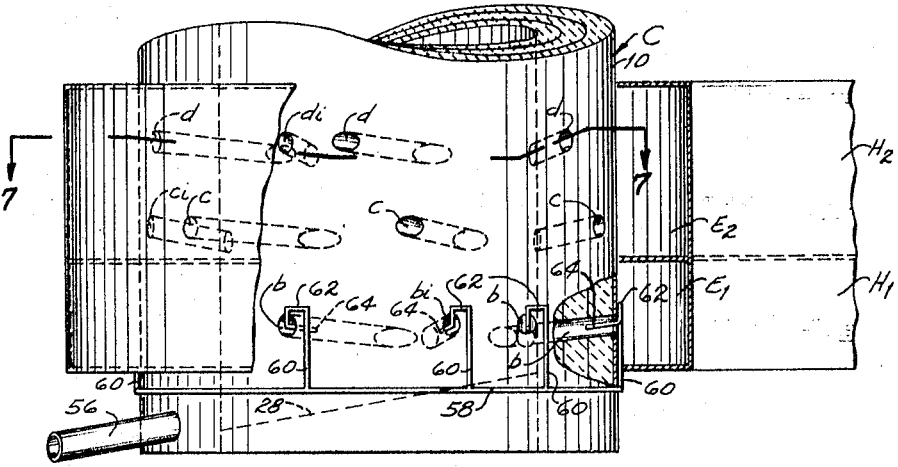
FIG. 8 is a partial sectioned elevational view along the lines 8—8 of FIG. 7.

FIGS. 6, 7 and 8 demonstrate the staggered and tangential relationship of the rows of tuyeres and duct arrangements in the levels of wind-boxes of the incinerator. It will be noted that the tuyere ports $a$, $b$, and $c$ are angled and therefore cannot be used as inspection ports. The angular configurations $b$, $c$ and $d$ may be as much as 60°, depending on the side of the unit and is an optional feature. The inspection ports are referred to in the figures as $bi$ located in the layer, $b$, $ci$ in layer $c$, and $di$ in layer $d$ of the tuyere ports.

FIGS. 7 and 8 show an auxiliary use of oxygen when found desirable or necessary to increase combustion rate and temperature of burning to desired levels such as from 2500° F. to 3400° F. Main oxygen line or manifold 58 (FIG. 8) is shown to be connected to tributaries or feeder lines 60 from the manifold to the "$b$" level tuyere ports with return bend 62 from said feeder lines 60. It is to be noted that the end 64 of oxygen lines with the tuyere ports should be approximately one-third of the way into the ports. In addition, while applicants' parent case referred to hereinabove employed mechanical valves for control of air introduction in the tuyere ports this is deemed to be optional only and the present disclosure is designed to operate with (not shown in the drawing) or without these valves, and with or without auxiliary oxygen supply thus it will be apparent that the drawings are intended to show these optional features. As shown in FIGS. 3, 6, 7, and 8, ports $bi$, $ci$, and $di$, are inspection ports only for information when required by the operator of conditions of the $b$, $c$, and $d$, levels in the furnace.

Referring again to FIG. 6, as well as FIGS. 7 and 8, it can be seen that the wind-box E1 surrounds the lower tuyere assembly substantially at the coke, or other fuel, area circumferentially about the stack shell 10, while wind-box E2 surrounds the upper tuyere assembly substantially circumferentially about the stack shell 10, while wind-box E2 surrounds the upper tuyere assembly substantially circumferentially around the refuse area of stack shell 10 and each of these sections afford different control areas for the combustion areas involved. In this way a more efficient, economical and effective means for the reduction of municipal refuse can be obtained to less than 2% by volume of the original, and results in a molten residue which when cooled by the atmosphere, becomes very useful, for example, as land fill without further treatment, since this residue is an inert inorganic substance similar to cinders; concrete aggregates; insulation; hot top for driveways, roads, and the like; preformed building blocks; and a host of other uses.

It will be apparent that the size of the incinerator of the present invention may vary in size in accordance with the intended capacity of the same but the average construction would have a capacity of about 300 tons per 24 hours. Such an incinerator would have an inside diameter of about 5 feet and an outside diameter of 7 feet. The height from floor to top would be approximately 58 feet with the chute located about 20 feet from the base or about one-third distance up from the floor to allow sufficient upward draft and the feed of rubbish, etc. The feed through chute B would be continuous by means of a conveyor, the chute being large enough to accommodate refrigerators, stoves, and all types of debris, organic and inorganic.

In summarizing the operation, "blast furnace" coke, or other fuel, is deposited through the chute B upon the sand base of the incinerator to a height of about twelve feet, a kerosene or gas torch is inserted through the slag trough 56 whereupon the fan G1 is activated forcing air and/or optionally oxygen, to ignite the coke. It takes about 30 to 40 minutes to get the temperature of the bed up to from 2500° F. to 3400° F., and preferably about 2700° F. The conveyor feeding refuse in the chute is then started but operated at a slower speed than normal to create a proper depth of feed in the bed above the coke. Fan G2 is then activated and both fans G1 and G2 are run at controlled speeds by electrical instruments (not shown) made and designed to automatically increase the introduction of air, and/or oxygen, upon an indicated drop of furnace temperature. If the temperature in the stack should drop below the required operating temperatures caused by lack of sufficient supply of refuse or coke through chute B, oxygen is admitted through the tuyeres of the bed in one or both levels E1 and E2 to prevent "freezing" of the furnace which if allowed to occur would require a complete shut-down and a most difficult condition to overcome. When the feed through the chute B is predominant of inorganic matter a supplemental supply of coke is metered into said chute and shut off after a predetermined interval. As the furnace temperature increases above the noted required temperatures the quantity of air or oxygen supplied to the tuyeres is automatically reduced.

At the controlled high temperatures of combustion the escaping gases at the top of the incinerator are invisible (without smoke). However, water is fed to the wet cap to coagulate any small particles of invisible dust and returned to the quenching tank 36 by way of trough 50 and is then continuously recirculated by means of pump 38 through pipes 40, 42 and over deflector 44. The gases of combustion with no pungent, acrid odors, or visible particles therein is allowed to escape to the atmosphere through screen 46. The cold water quenching of the fused residue in the trough 36 causes the same to take the form of small particle size aggregates having many commercial uses as set forth hereinabove. In addition this final residue is not only extremely small in quantity as compared with residues obtained from prior art municipal incinerators but the character of the same is reduced to a totally inert, inorganic material which when deposited upon the ground will not pollute any watershed area in the vicinity.

It will be apparent that wide variations may be made from the forms of the invention disclosed without departing from the spirit of the invention and within the scope of the appended claims.

Having thus described the invention and illustrated its use, what is claimed as new and what is desired to be secured by Letters Patent is:

1. The method of disposing municipal-type refuse of organic and inorganic matter in a substantially vertical incinerator stack and having at least two separate wind-boxes surrounding the outside of said stack near the bottom thereof for supplying separately controlled combustion-supporting gases under superatmospheric pressures through separate tuyere systems from separate gas pressure sources into the combustion areas of said stack, said stack having a feed charging means above or at said combustion areas, the steps of introducing controlled amounts of refuse materials through said charging means to said combustion areas adjacent to the bottom of said stack, simultaneously passing separate combustion-supporting gases under superatmospheric pressures tangentially into the separate wind-boxes, introducing separately controlled volumes and pressures of said gases into the combustion areas from said wind-boxes, maintaining the temperature in the combustion areas between about 2500° F. and 3400° F., spraying the escaping gaseous products of combustion at the top of said stack with water, collecting and introducing said sprayed water to a quenching trough containing the removed residue of combustion, recirculating said water back to the top of said stack for continuous spraying of the escaping gases of combustion, and removing the incombustible residue near the bottom of said stack.

2. The method of claim 1 wherein the volumes and pressures of the gases supplied to the wind-boxes are regulated by varying the output pressures and capacities of separate fans into separate ducts for exclusive tangential entry of said gases into said wind-boxes.

3. An incinerator for municipal-type waste material comprising a cylindrical vertical stack, at least two adjacent separate wind-boxes near the bottom thereof and extending outside said stack, separate source pressure producing means in combination with separate ducts, said ducts joining said wind-boxes tangentially to the inner and outer walls of each of said wind-boxes for forcing individually controlled volumes of combustion-supporting gas into and around each of said wind-boxes to the respective combustion area levels in said stack, a charging chute located above or at said combustion area, and means at the bottom of said stack for removing the residue of combustion.

4. The incinerator of claim 3 wherein the separate means for forcing controlled volumes of combustion-supporting gas into the wind-boxes comprises separate fans and ducts, each having separately controllable pressure and volume capacities respectively for delivery of said gases exclusively tangentially into each wind-box.

5. The incinerator of claim 3 which includes a quenching trough near the bottom of the stack arranged to receive residue from said residue-removing means, and means to arrest dust and fumes including a wet-cap assembly above the open top of said incinerator and means for recirculation of water from the trough to the wet-cap assembly and back to the residue-removing means.

References Cited

UNITED STATES PATENTS

| | | |
|---|---|---|
| 2,738,776 | 3/1956 | Burg. |
| 54,552 | 5/1866 | Insull _____ 266—30 |
| 443,898 | 12/1890 | Colquhoun _____ 65—19 |
| 769,872 | 9/1904 | Ochwat _____ 110—8 |
| 1,695,953 | 12/1928 | Field. |
| 2,698,587 | 1/1955 | Knipe et al. _____ 110—18 X |
| 2,804,031 | 8/1957 | Douglass _____ 110—18 |
| 2,869,487 | 1/1959 | Sherman _____ 110—8 |
| 2,915,025 | 12/1959 | Stevenson _____ 110—18 |
| 2,136,360 | 11/1938 | Clair _____ 265—25 X |
| 2,539,638 | 1/1951 | Schilling _____ 263—29 X |

FOREIGN PATENTS

| | | |
|---|---|---|
| 18,291 | 1889 | Great Britain. |
| 5,206 | 1915 | Great Britain. |
| 22,067 | 1900 | Great Britain. |

FREDERICK L. MATTESON, JR., Primary Examiner

HARRY B. RAMEY, Assistant Examiner